United States Patent
Rhim (10) Patent No.: US 8,359,395 B2
(45) Date of Patent: *Jan. 22, 2013

(54) SERVICE DISTRIBUTION APPARATUS AND METHOD

(75) Inventor: Eun-hee Rhim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/692,039

(22) Filed: Jan. 22, 2010

(65) Prior Publication Data

US 2010/0119064 A1  May 13, 2010

Related U.S. Application Data (62) Division of application No. 11/773,691, filed on Jul. 5, 2007, now Pat. No. 8,108,532.

(60) Provisional application No. 60/840,715, filed on Aug. 29, 2006.

(30) Foreign Application Priority Data

Nov. 9, 2006 (KR) .................... 10-2006-0110739

(51) Int. Cl.
*G06F 15/173* (2006.01)

(52) U.S. Cl. ........ 709/229; 709/200; 709/202; 709/217; 709/231; 709/232; 725/10; 725/58; 725/60; 725/120

(58) Field of Classification Search .................. 709/200, 709/217, 202, 229, 231, 232; 725/60, 10, 725/58, 120

See application file for complete search history.

(56) References Cited

U.S. PATENT DOCUMENTS

| | | | |
|---|---|---|---|
| 6,097,441 A * | 8/2000 | Allport | 348/552 |
| 6,408,436 B1 * | 6/2002 | de Haas | 725/86 |
| 6,754,907 B1 | 6/2004 | Schumacher et al. | |
| 7,379,778 B2 * | 5/2008 | Hayes et al. | 700/66 |

(Continued)

FOREIGN PATENT DOCUMENTS

| EP | 0398492 A2 | 11/1990 |
|---|---|---|
| EP | 1 503 584 A2 | 2/2005 |

(Continued)

OTHER PUBLICATIONS

Vijayakumar et al. "Application-Independent Session Mobility Between User Terminals" Mobility Aware Technologies and Applications Lecture Notes in Computer Science, vol. 3744, Jan. 2005, pp. 305-315.

(Continued)

*Primary Examiner* — John Follansbee
*Assistant Examiner* — Anthony Mejia
(74) *Attorney, Agent, or Firm* — Sughrue Mion, PLLC (57) ABSTRACT

A service distribution apparatus and method are provided. The service distribution apparatus includes a service module that provides a plurality of separable services; a storage module that stores group information of service reproduction apparatuses which reproduce the services, and a service control module that distributes requested services to different service reproduction apparatuses, respectively, based on the group information.

12 Claims, 10 Drawing Sheets

U.S. PATENT DOCUMENTS

| | | | |
|---|---|---|---|
| 7,460,546 B2 * | 12/2008 | Anderson, IV | 370/401 |
| 7,685,257 B2 * | 3/2010 | King et al. | 709/219 |
| 7,818,769 B2 * | 10/2010 | Peacock et al. | 725/54 |
| 7,823,181 B2 * | 10/2010 | Gaughan et al. | 725/110 |
| 2002/0046180 A1 | 4/2002 | Niwa | |
| 2002/0092016 A1 | 7/2002 | Offer | |
| 2002/0107973 A1 * | 8/2002 | Lennon et al. | 709/231 |
| 2002/0164155 A1 * | 11/2002 | Mate | 386/96 |
| 2003/0055977 A1 | 3/2003 | Miller | |
| 2004/0004630 A1 * | 1/2004 | Kalva et al. | 345/702 |
| 2004/0175098 A1 * | 9/2004 | Calhoon et al. | 386/46 |
| 2005/0028208 A1 * | 2/2005 | Ellis et al. | 725/58 |
| 2005/0198335 A1 | 9/2005 | Brown et al. | |
| 2005/0252959 A1 | 11/2005 | Gaumond et al. | |
| 2006/0031883 A1 * | 2/2006 | Ellis et al. | 725/58 |
| 2006/0059528 A1 * | 3/2006 | Katayama et al. | 725/114 |
| 2006/0271996 A1 * | 11/2006 | Sato | 725/135 |
| 2007/0113246 A1 * | 5/2007 | Xiong | 725/39 |
| 2007/0143493 A1 * | 6/2007 | Mullig et al. | 709/232 |
| 2007/0236613 A1 * | 10/2007 | Foss | 348/734 |
| 2007/0261095 A1 * | 11/2007 | Petrisor et al. | 725/131 |
| 2008/0010655 A1 * | 1/2008 | Ellis et al. | 725/38 |
| 2008/0022381 A1 * | 1/2008 | Le Saint | 726/9 |
| 2008/0092175 A1 * | 4/2008 | Peacock et al. | 725/60 |
| 2008/0189742 A1 * | 8/2008 | Ellis et al. | 725/39 |
| 2009/0138719 A1 | 5/2009 | Franz | |
| 2009/0157697 A1 * | 6/2009 | Conway et al. | 707/10 |
| 2009/0257589 A1 * | 10/2009 | Yokota et al. | 380/216 |
| 2009/0320073 A1 * | 12/2009 | Reisman | 725/51 |

FOREIGN PATENT DOCUMENTS

| | | |
|---|---|---|
| JP | 2002-135810 A | 5/2002 |
| JP | 2002-185876 A | 6/2002 |
| KR | 10-2003-0079160 A | 10/2003 |
| KR | 2004-086738 A | 10/2004 |
| KR | 100532065 B1 | 11/2005 |
| KR | 2006-080318 A | 7/2006 |
| WO | 2004084555 A1 | 9/2004 |
| WO | 2007/082860 A1 | 7/2007 |

OTHER PUBLICATIONS

Summons to Oral Proceedings issued May 8, 2012 by the European Patent Office in counterpart European Application No. 09160868.7.
Welling, Girish et al. "Session Mobility Support for Multimedia Applications", IS&T/SPIE Conference on Multimedia Computing and Networking, Jan. 1999, vol. 3654, pp. 52-63.

\* cited by examiner

```xml
<?xml version="1.0"?>
<GROUP_REG_REQ>
    <AccessUser>Jane-AG200608-1234567</AccessUser>  <!-- USER INFORMATION -->
    <!-- SERVICE CATEGORY OF USER (E.G., IMSS SERVICE USING BROADCASTING AND PORTAL) -->
    <ServiceType>IMSS_BB_PORTAL_NORMAL</ServiceType>
    <GroupProperty>
            <!-- DESIGNATE GROUP NAME UNIQUELY RECOGNIZED BY SERVICE PROVIDER -->
            <groupName>Jane:1234567_SVabcde</AccessName>
            <AccessUnit>2</AccessUnit>  <!-- NUMBER OF DEVICES INCLUDED IN GROUP -->
            <UnitInformation>  <!-- DESCRIPTION OF ADDRESS AND CAPABILITY OF EACH DEVICE INCLUDED IN GROUP -->
                    <!-- REAL ADDRESS OF EACH DEVICE INCLUDED IN GROUP -->
                    <UnitAddress>MP_HS_MAC:M2:RT:9S:Q0</UnitAddress>
                    <UnitAlias>Jane.HandSet01</UnitAlias>  <!-- ALIAS ASSOCIATED WITH GROUP NAME OF EACH DEVICE INCLUDED IN GROUP -->
                    <UnitCapability>Standard_2M</UnitCapability>
            </UnitInformation>
            <UnitInformation>
                    <UnitAddress>STB_Maplus_MAC:23:RT:9S:Q0</UnitAddress>
                    <UnitAlias>Jane.STB01</UnitAlias>
                    <UnitCapability>High:100M</UnitCapability>
            </UnitInformation>
    </GroupProperty>
</GROUP_REG_REQ>
```

FIG. 6

```xml
<?xml version="1.0"?>
<SVC_FRACTION_REQ>  <!-- SERVICE SEPARATION REQUEST USING FAMILY ADDRESSING METHOD -->
    <FractionalSvc>Portal_AV:FunctionID7711</FractionalSvc>  <!-- FUNCTIONAL INFORMATION OF SERVICE TO BE SEPARATED -->
    <PlayUnit>Jane.STB01</PlayUnit>  <!-- DEVICE WHICH WILL RECEIVE SEPARATED SERVICE -->
    <PlayQuality>High:100M</PlayQuality>  <!-- QUALITY OF SERVICE/DATA TO BE USED -->
</SVC_FRACTION_REQ>
```

```
<?xml version="1.0"?>
<SVC_FRACTION_REQ> <!-- SERVICE SEPARATION REQUEST USING FIRST SEND
AND LAST CHECK METHOD-->
    <FractionalSvc>Portal_AV:FunctionID7711</FractionalSvc>    <!--   FUNCTIONAL
INFORMATION OF SERVICE TO BE SEPARATED -->
    <PlayUnit>MAC:23:RT:9S:Q0</PlayUnit> <!-- ADDRESS OF DEVICE WHICH WILL
RECEIVE SEPARATED SERVICE -->
    <PlayQuality>High:100M</PlayQuality> <!-- QUALITY OF SERVICE/DATA TO BE USED
-->
</SVC_FRACTION_REQ>
```

FIG. 12

```xml
<?xml version="1.0"?>
```
<!-- NOTIFICATION OF TRANSMISSION OF KEY INDICATING THE START OF SERVICE SEPARATION FROM SERVER IN FIRST SEND LAST CHECK METHOD -->
```
<SVC_FRACTION_CONTROL_AAAKEY>
    <FractionalSvc>Portal_AV:IMSS_SvcID007_FunctionID7711</FractionalSvc>
    <FSConsumeSide>MAC:23:RT:9S:Q0</FSConsumeSide>
```
<!-- INFORMATION ABOUT DEVICE WHICH WILL USE KEY -->
```
    <FSStartMethod>DRM_SuperSonic_v8923</FSStartMethod>
```
<!--DRM METHOD TO WHICH KEY VALUE IS APPLIED -->
```
    <FSKey>oxoxox:r0w91334j:#KDD@sk001</FSKey>
```
<!-- KEY VALUE -->
```
</SVC_FRACTION_CONTROL_AAAKEY>
```

FIG. 13

```xml
<?xml version="1.0"?>
```
<!-- NOTIFICATION OF TRANSMISSION OF SEPARATED SERVICE FROM SERVER IN FIRST SEND LAST CHECK METHOD -->
```
<SVC_FRACTION_FORCED_DOWN>
    <FractionalSvc>Portal_AV:IMSS_SvcID007_FunctionID7711</FractionalSvc>
    <FSRequestSide>MAC:M2:RT:9S:Q0</FSRequestSide>
```
<!--INFORMATION ABOUT DEVICE WHICH HAS MADE SERVICE SEPARATION REQUEST -->
```
    <FSStartMethod>DRM_SuperSonic_v8923</FSStartMethod>
    <FSKeySyncSide>MAC:M2:RT:9S:Q0</FSKeySyncSide>
```
<!-- INFORMATION ABOUT DEVICE HAVING KEY -->
```
</SVC_FRACTION_FORCED_DOWN>
```

SERVICE DISTRIBUTION APPARATUS AND METHOD

This application is a divisional of U.S. application Ser. No. 11/773,691 filed on Jul. 5, 2007, which claims priority from Korean Patent Application No. 10-2006-0110739 filed on Nov. 9, 2006 in the Korean Intellectual Property Office, and U.S. Provisional Patent Application No. 60/840,715, filed on Aug. 29, 2006 in the United States Patent and Trademark Office, the disclosures of which are incorporated herein by reference in its entirety.

BACKGROUND OF THE INVENTION

1. Field of the Invention

Apparatuses and methods consistent with the present invention relate to service distribution, and more particularly, to distributing a plurality of services received through a network to two or more service reproduction apparatuses.

2. Description of the Related Art

With the advancement of communication technology, various content, such as application programs, are being provided to broadcast receiving apparatuses and mobile devices through wired or wireless networks.

For example, while watching a broadcast on a digital television (TV) at home, a user can pop up an electronic program guide (EPG) screen in order to obtain program information of other channels and can execute a relevant application program in order to obtain current weather, traffic, and securities information. In addition, the user is in a television commerce (T-commerce) environment in which the user can purchase goods, make payments, and do shopping using a remote control. Therefore, while watching the broadcast, the user can purchase desired goods by executing an authentication or billing application program.

The broadcast that the user is watching, the EPG screen, the weather information, the traffic information, the securities information, and the authentication or billing application program are 'services' provided to the user through the digital TV.

The services are managed by respective servers and can be provided to the user through a network having a broad frequency band. Examples of the related art servers are illustrated in FIGS. 1A and 1B.

Figure 1A:
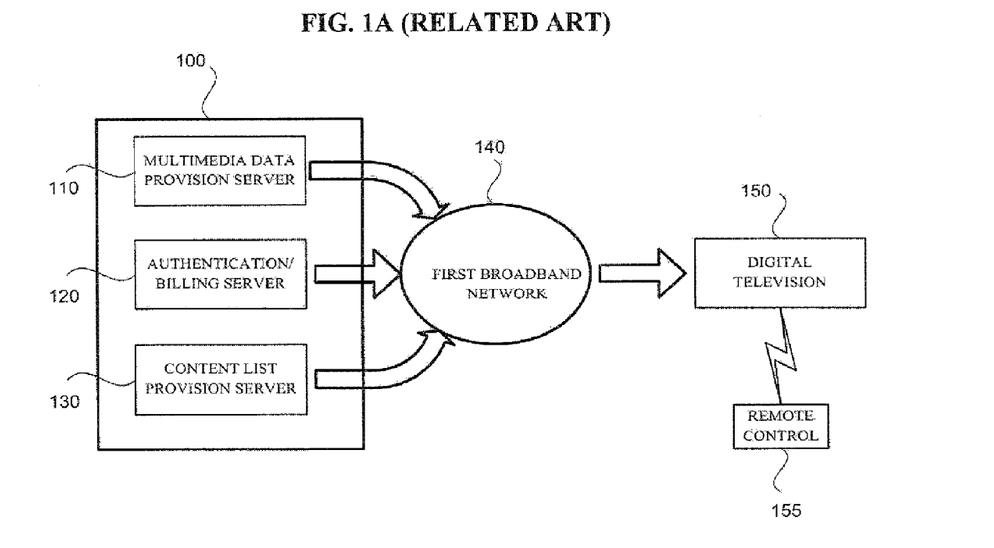
FIGS. 1A and 1B illustrate a related art service provision system.

Referring to FIG. 1A, a multimedia data provision server 110 provides multimedia data, such as broadcast signals or audio/video (AV) streams, an authentication/billing server 120 authenticates a user or an apparatus and performs a billing function, and a content list provision server 130 provides a list of various types of content. There may also be a server which can provide all the functions of the above servers. In FIG. 1A, this server is referred to as a 'service server' 100.

The service server 100 transmits services to a service reproduction apparatus, e.g., a digital TV 150, of a user through a first broadband network 140. Then, the user can select and reproduce a desired service using a remote control 155.

Figure 1B:
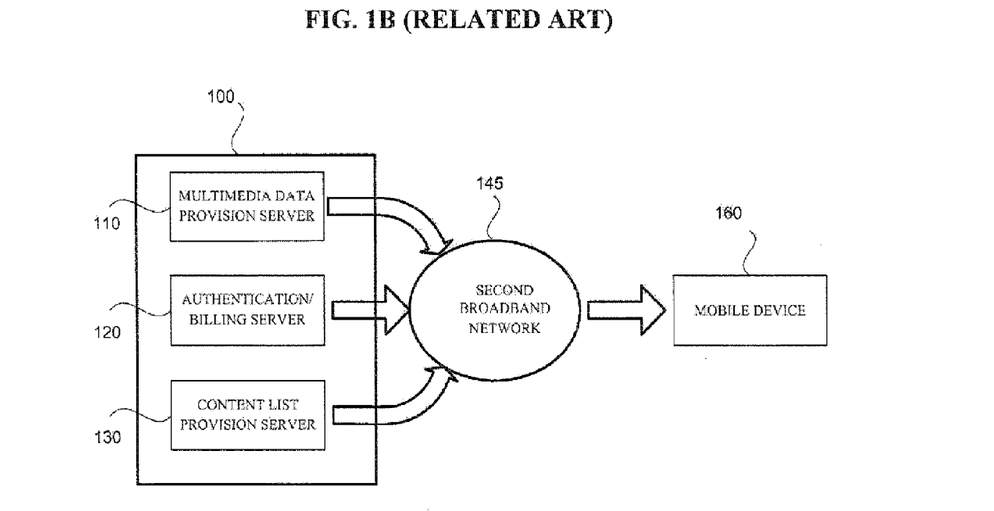

Referring to FIG. 1B, the service server 100 transmits services to a mobile device 160 of a user through a second broadband network 145. Then, the user can select and reproduce a desired service using the mobile device 160 no matter where the user is.

As described above, when a user is in an environment where the user is provided with various types of services and can select and reproduce a specific service, the user can conveniently use desired services only after securing a list of services provided by a plurality of service providers and relevant information.

In this case, according to the related art service provision method illustrated in FIGS. 1A and 1B, the digital TV 150 displays a list of content to overlap on a multimedia data reproduction screen. In addition, a user cannot receive or view the list of content, which is provided by the digital TV 150, using another device.

That is, according to the related art method, since a user can reproduce a plurality of services provided through a single broadband network using only one device, the services are displayed overlapped on each another, thereby making it less convenient for the user to select and use desired services.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for distributing a plurality of services provided through a single broadband network to a plurality of apparatuses.

According to an aspect of the present invention, there is provided a service server comprising a service module which provides a plurality of separable services; a storage module which stores group information of service reproduction apparatuses that reproduce the services; and a server control module which distributes requested services to different service reproduction apparatuses, respectively, based on the group information.

According to another aspect of the present invention, there is provided a service reproduction apparatus comprising a service reproduction module which reproduces services; and an apparatus control module which transmits information regarding a desired service to a server that provides the service while the service reproduction module reproduces the services.

According to another aspect of the present invention, there is provided a service distribution method comprising receiving a service separation request from a service reproduction apparatus which reproduces services; and transmitting a service separated from the services reproduced by the service reproduction apparatus to a requested service reproduction apparatus with reference to group information.

According to another aspect of the present invention, there is provided a service distribution method comprising making a service separation request using a first service reproduction apparatus; receiving a separated service using a second service reproduction apparatus; and reproducing the received service using the second service reproduction apparatus.

The method further comprises transmitting group information of service reproduction apparatuses which reproduce services and a service separation request; receiving a service separated from the services according to the service separation request, and reproducing the received service.

According to another aspect of the present invention, there is provided a service reproduction apparatus comprising a service reproduction module which reproduces services; a control module which separates a functionally separable service from the services being reproduced by the service reproduction module; and an apparatus interface module which transmits data on the separated service to another service reproduction apparatus.

According to another aspect of the present invention, there is provided a service distribution method comprising reproducing services; separating a functionally separable service from the services being reproduced; and transmitting data on the separated service to another service reproduction apparatus.

According to another aspect of the present invention, there is provided a service server comprising a service module which provides a plurality of services which can be separated from one another; an authentication key generation module which generates authentication keys for reproducing the services; and a server control module which separates a requested service from the services in response to a service separation request and provides the separated service and an authentication key.

According to another aspect of the present invention, there is provided a service distribution method comprising receiving a service separation request; separating a service in response to the service separation request and generating an authentication key for reproducing the separated service; and transmitting the separated service and the generated authentication key.

According to another aspect of the present invention, there is provided a service reproduction apparatus comprising a service reproduction module which reproduces services; an apparatus control module which makes a service separation request to a service server and receives an authentication key for reproducing a service which is separated from the services being reproduced by the service reproduction module according to the service separation request; and an authentication key storage module which stores the received authentication key, wherein the apparatus control module provides the received authentication key.

According to another aspect of the present invention, there is provided a service reproduction apparatus comprising an apparatus control module which receives a service separated according to a service separation request and an authentication key for reproducing the separated service from a service reproduction apparatus which has made the service separation request; and a service reproduction module which reproduces the separated service using the received authentication key.

According to another aspect of the present invention, there is provided a service distribution method comprising making a service separation request to a service server; receiving an authentication key for reproducing a service separated according to the service separation request; and providing the received authentication key.

According to another aspect of the present invention, there is provided a service distribution method comprising receiving a service separated according to a service separation request made by a service reproduction apparatus; receiving an authentication key for reproducing the separated service; and reproducing the separated service using the received authentication key.

BRIEF DESCRIPTION OF THE DRAWINGS

The above and other aspects of the present invention will become more apparent by describing in detail exemplary embodiments thereof with reference to the attached drawings in which:

FIG. 5 illustrates group information according to an exemplary embodiment of the present invention;

FIG. 6 illustrates the structure of data transmitted in order to make a service separation request according to an exemplary embodiment of the present invention;

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art.

Hereinafter, a service distribution apparatus and method according to exemplary embodiments of the present invention will be described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In an exemplary embodiment of the present invention, a 'service' indicates a collection of objects which can be functionally separated from one another, such as applications providing broadcast programs, broadcast program information, weather information, traffic information and securities information, online commerce, video or text data communication, and audio/video (AV) stream reproduction. Therefore, a service provided by a service provider may be divided into a plurality of sub-services that form the service.

Figure 2:
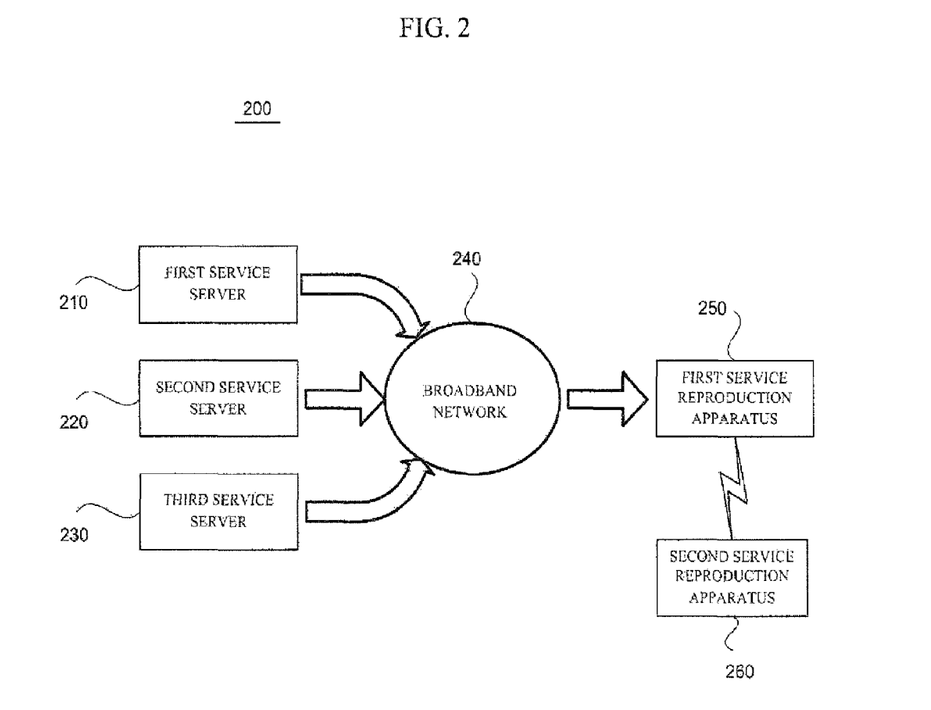
FIG. 2 illustrates the concept of a service distribution system according to an exemplary embodiment of the present invention.

FIG. 2 illustrates the concept of a service distribution system 200 according to an exemplary embodiment of the present invention.

Referring to FIG. 2, the service distribution system 200 includes first through third service servers 210 through 230 providing various types of services, a broadband network 240 through which data regarding the services is transmitted, and first and second service reproduction apparatuses 250 and 260 reproducing the services received through the broadband network 240.

The first through third service servers 210 through 230 illustrated in FIG. 2 may be distinct servers that are physically separated from one another or logical servers that are functionally separated from one another within one physical server. In addition, the first through third service servers 210 through 230 illustrated in FIG. 2 may be provided by a service provider or by a plurality of different service providers for respective services.

The broadband network 240 provides a frequency bandwidth broad enough to deliver various types of services.

The first and second service reproduction apparatuses 250 and 260 reproduce services transmitted through the broadband network 240 by a user's manipulations. The services may be distributed according to the user's selection and reproduced accordingly. The first and second service reproduction apparatuses 250 and 260 may communicate with each other using a communication method different from the one using the broadband network 240. For example, a conventional communication method, such as IEEE 1394, IEEE 802.15.3, or a wired or wireless universal serial bus (USB) protocol, may be used.

It may be assumed that the first service server 210 provides an AV stream service and that the second service server 220 provides broadcast program information such as an electronic program guide (EPG).

These services are transmitted through the broadband network 240 to the first service reproduction apparatus 250 connected to the broadband network 240.

Here, the user may distribute the AV stream service provided by the first service server 210 to the first service reproduction apparatus 250 and the broadcast program information provided by the second service server 220 to the second service reproduction apparatus 260 using a service distribution method according to an exemplary embodiment of the present invention. Then, the first and second reproduction apparatuses 250 and 260 may reproduce the AV stream service and the broadcast program information, respectively.

A specific exemplary embodiment of the service distribution method will now be described with reference to FIGS. 3 through 8.

Figure 3:
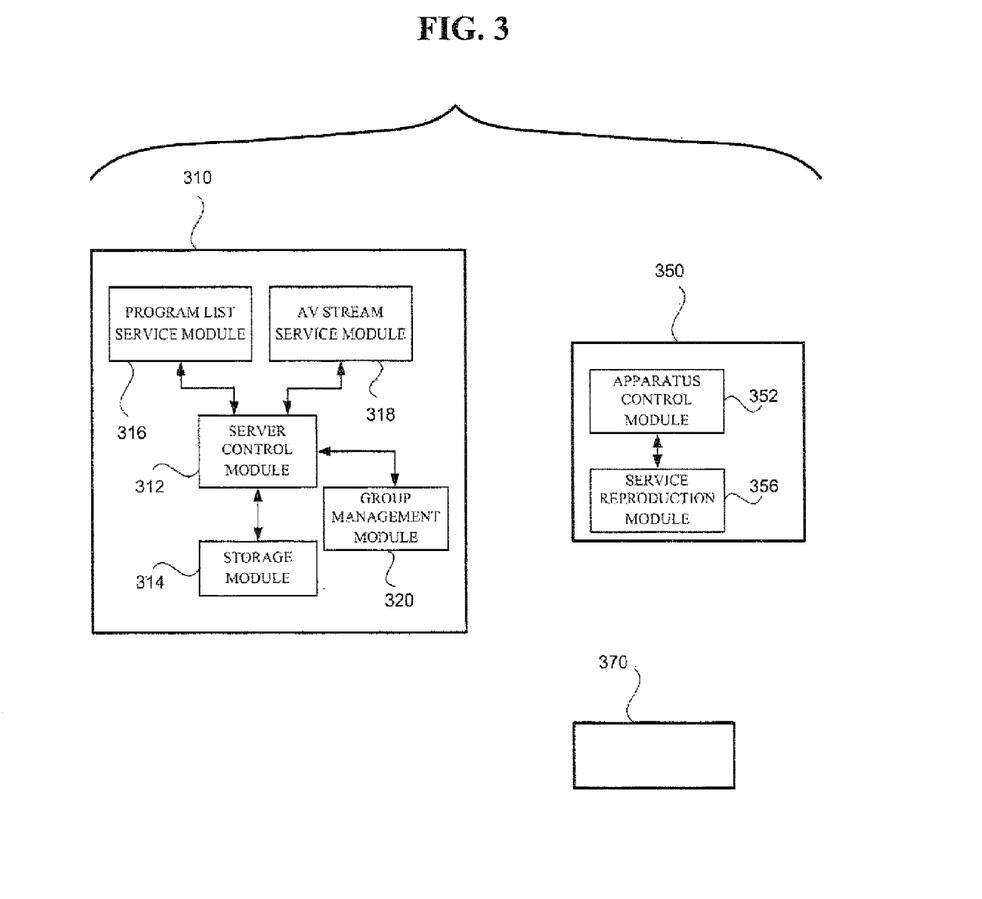
FIG. 3 is a block diagram of a service distribution system according to an exemplary embodiment of the present invention.

FIG. 3 is a block diagram of a service distribution system according to an exemplary embodiment of the present invention. Referring to FIG. 3, the service distribution system includes a service server 310, a first service reproduction apparatus 350, and a second service reproduction apparatus 370.

The service server 310 includes a server control module 312, a storage module 314, a program list service module 316, an AV stream service module 318, and a group management module 320.

The server control module 312 manages the overall operation of the service server 310 and controls service distribution at the request of a service reproduction apparatus.

The storage module 314 stores group information of service reproduction apparatuses. In the present invention, a 'group' is a logical unit indicating a collection of a plurality of service reproduction apparatuses. Therefore, the group information includes group names and unique identification information of service reproduction apparatuses included in each group.

For example, if a service reproduction apparatus having unique identification information 'Dev-1' and a service reproduction apparatus having unique identification information 'Dev-2' are included in a group 'Jane,' the service reproduction apparatuses may be represented as 'Jane.Dev-1' and 'Jane.Dev-2,' respectively, and this information may be stored in the storage module 314. A group name must be uniquely recognizable on a broadband network on which a service server communicates with a plurality of service reproduction apparatuses.

The program list service module 316 provides a program list service to a service reproduction apparatus at the request of the service reproduction apparatus. The AV stream service module 318 provides an AV stream service for a program selected by the user from the program list to the service reproduction apparatus. The program list service module 316 and the AV stream service module 318 are mere examples, and the service server 310 may further include service modules providing different types of services.

The group management module 320 generates and manages information regarding each group to which a plurality of service reproduction apparatuses belong. The group information may be determined by an administrator of the service server 310.

The first service reproduction apparatus 350 includes an apparatus control module 352 and a service reproduction module 356.

The apparatus control module 352 controls the overall operation of the first service reproduction apparatus 350 and transmits to the service server 310 information regarding a service that it desires the service server 310 to distribute to another service reproduction apparatus.

The service reproduction module 356 reproduces services provided by the service server 310.

The second service reproduction apparatus 370 has the same structure as the first service reproduction apparatus 350.

The service distribution method used by the service server 310 and the first and second service reproduction apparatuses 350 and 370 illustrated in FIG. 3 will now be described in detail with reference to FIG. 4.

Figure 4:
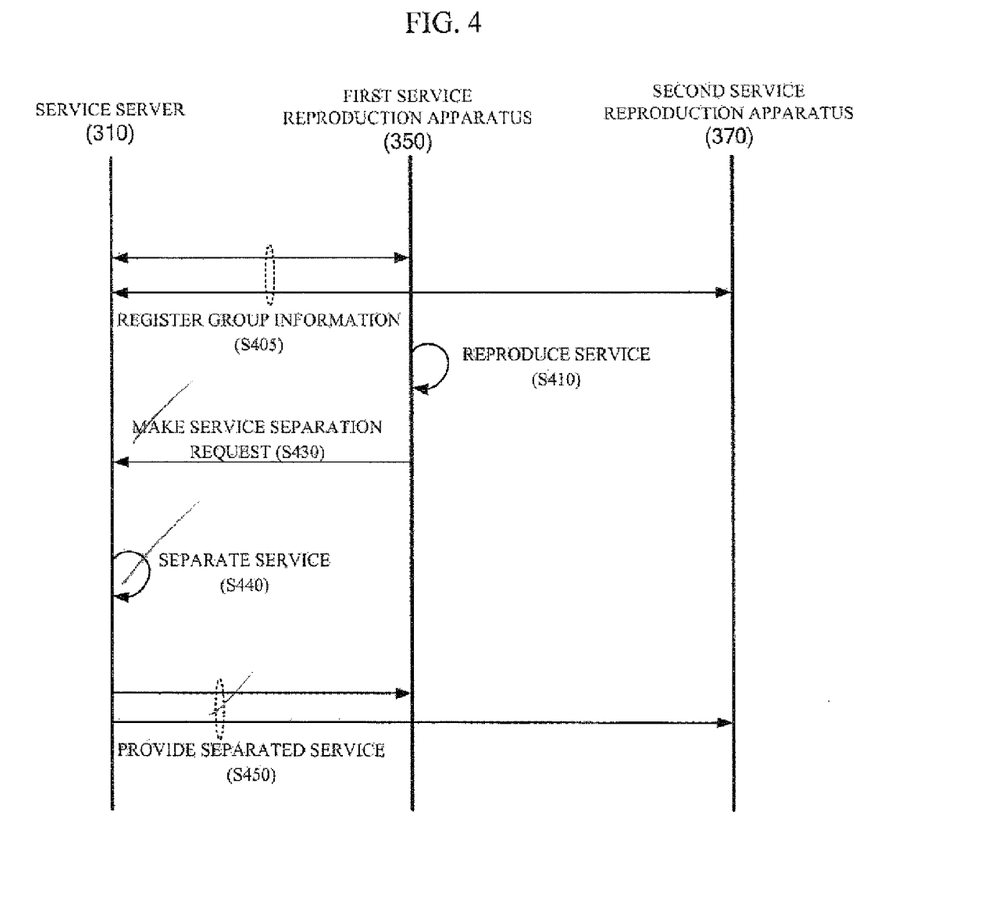
FIG. 4 illustrates a service distribution method according to an exemplary embodiment of the present invention.

Referring to FIG. 4, group information is registered with the service server 310 (operation S405). It is assumed that a user is reproducing one or more services provided by the service server 310 using the service reproduction module 356 of the first service reproduction apparatus 350 (operation S410).

Here, information regarding each group to which a plurality of service reproduction apparatuses belong is registered. For example, if the first and second service reproduction apparatuses 350 and 370 are included in the same group, group information of the first and second service reproduction apparatuses 350 and 370 is registered before the first and second service reproduction apparatuses 350 and 370 reproduce services.

For example, a data structure of the group information transmitted by the first service reproduction apparatus 350 to the service server 310 may be represented in an XML form as illustrated in FIG. 5.

Referring to FIG. 5, an 'AccessUser' element indicates user information, and a 'ServiceType' element indicates a service category. In addition, a 'GroupProperty' element describes group information. Specifically, a 'groupName' element indicates a group name, and a 'UnitInformation' element indicates identification information of a service reproduction apparatus having the group name. In FIG. 5, the group name is 'Jane:1234567_SVabcde,' where '1234567_SVabcde' is a real group name and 'Jane' may be understood as an alias. The identification information may include a real address (a 'UnitAddress' element) of the service reproduction apparatus, an alias (a 'UnitAlias' element) associated with the group name and identification information of the service reproduction apparatus, and resource information (a 'UnitCapability' element) of the service reproduction apparatus. In FIG. 5, the resource information contains information regarding data transmission speed.

A user may desire to reproduce some of the services being reproduced by the first service reproduction apparatus 350 or another service provided by the service server 310 using the second service reproduction apparatus 370. In this case, the user makes a service separation request to the service server 310 using the first service reproduction apparatus 350 (operation S430). Here, the apparatus control module 352 of the first service reproduction apparatus 350 may provide a user interface by which the user can select which service provided by the service server 310 to distribute to which service reproduction apparatus included in which group. When the first service reproduction apparatus 350 makes the service separation request to the service server 310, it may transmit data containing the name of a group and the identification information of a service reproduction apparatus, which are requested by the user. An example of the transmitted data is illustrated in FIG. 6.

Referring to FIG. 6, an 'SVC_FRACTION_REQ' element is for making a service separation request. Specifically, a 'FractionalSVC' element indicates functional information of a service that is to be separated from the services reproduced by the first service reproduction apparatus 350, and a 'PlayUnit' element indicates identification information of a service reproduction apparatus that receives the service. In addition, a 'PlayQuality' element indicates resource information of the service that is to be used.

When the service server 310 receives the service separation request from the first service reproduction apparatus 350, the server control module 312 of the service server 310 separates a service from the services reproduced by the first service reproduction apparatus 350 (operation S440) and provides the separated service to a corresponding service reproduction apparatus with reference to the group information stored in the storage module 314 (operation S450).

In FIG. 4, the separated service is provided to the second service reproduction apparatus 370. For example, the user may use the AV stream service provided by the AV stream service module 318 through the first service reproduction apparatus 350 and the program list service provided by the program list service module 316 through the second service reproduction apparatus 370.

Figure 7:
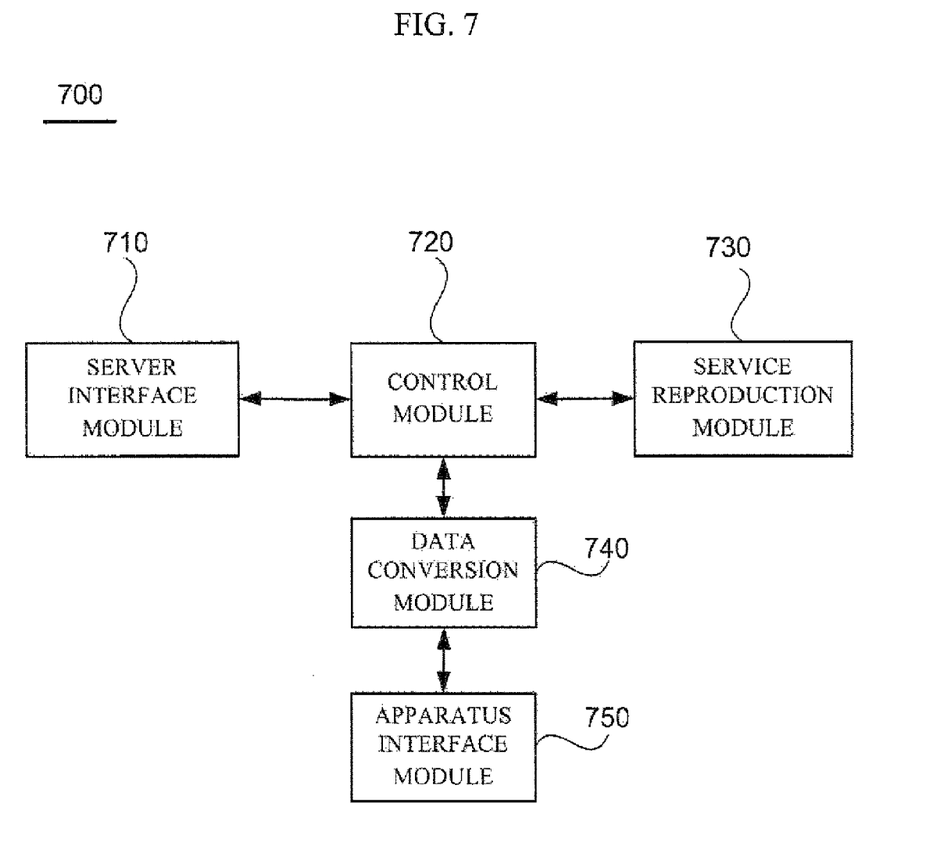
FIG. 7 is a block diagram of a service reproduction apparatus according to another exemplary embodiment of the present invention.

FIG. 7 is a block diagram of a service reproduction apparatus 700 according to another exemplary embodiment of the present invention. Referring to FIG. 7, the service reproduction apparatus 700 includes a server interface module 710, a control module 720, a service reproduction module 730, a data conversion module 740, and an apparatus interface module 750.

The server interface module 710 communicates with a service server through a broadband network and receives services from the service server.

The control module 720 controls the service reproduction module 730 to reproduce the services received from the service server, separates a functionally separable service from the received services at the request of a user, and creates a control to transmit the separated service to a corresponding service reproduction apparatus.

Under the control of the control module 720, the service reproduction module 730 reproduces the services received from the service server.

The data conversion module 740 converts data on the separated service into data having a format which can be understood by the service reproduction apparatus that is to reproduce the separated service. To this end, the conversion module 740 may store, in advance, information regarding a service data format provided by the service server and a service data format that can be reproduced by another service reproduction apparatus.

The apparatus interface module 750 communicates with another service reproduction apparatus and transmits service data converted by the data conversion module 740 to the service reproduction apparatus.

Hereinafter, the service distribution method performed by each module of the service reproduction apparatus 700 illustrated in FIG. 7 will be described with reference to FIG. 8. It is assumed that a second service reproduction apparatus 702 illustrated in FIG. 8 includes an interface module communicating with another service reproduction apparatus such as the first service reproduction apparatus 700 and has a service reproduction function.

Figure 8:
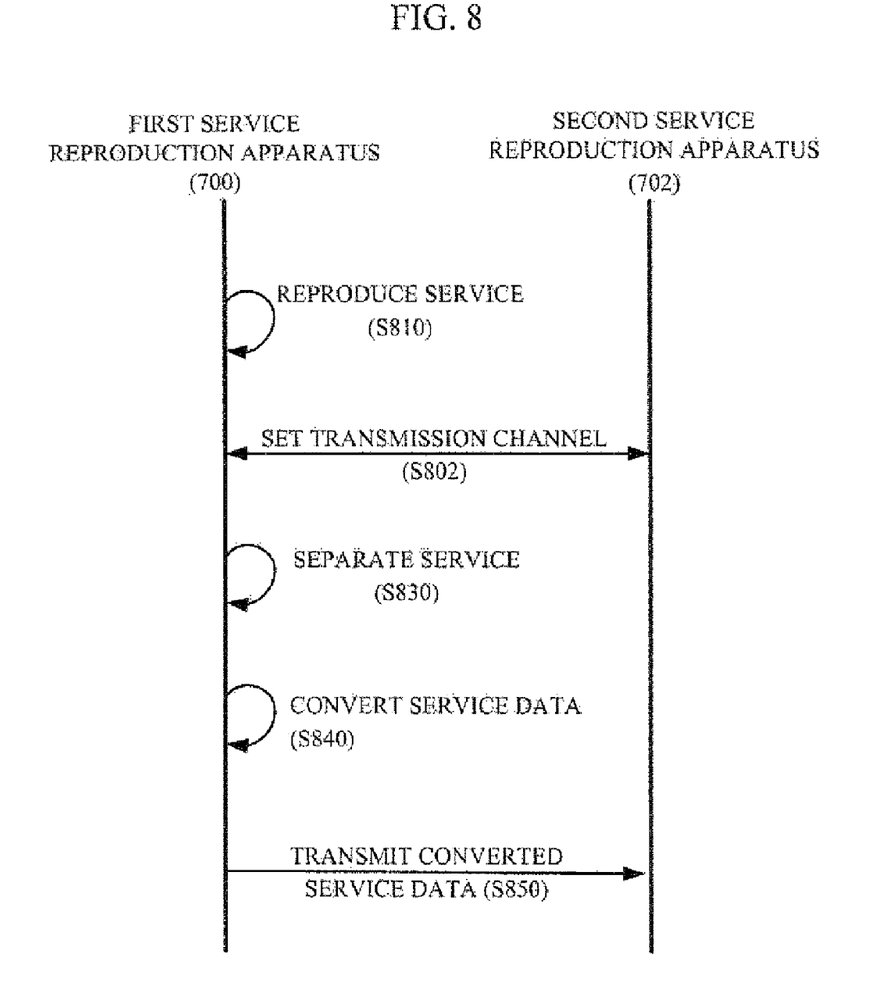
FIG. 8 illustrates a service distribution method according to another exemplary embodiment of the present invention.

Referring to FIG. 8, the service reproduction module 730 of the first service reproduction apparatus 700 reproduces services received from the service server (operation S810). If a user desires to separate a functionally separable service from the services being reproduced by the first service reproduction apparatus 700 and execute the separated service using the second service reproduction apparatus 702, the user selects a service to separate from the services being reproduced and a service reproduction apparatus which will execute the separated service on a user interface (not shown) provided by the first service reproduction apparatus 700.

If the user's request is input as described above, the apparatus interface module 750 connects the first service reproduction apparatus 700 with the second service reproduction apparatus 702 and thus forms a channel for transmitting data on the separated service (operation S820). In this case, the connection between the first and second service reproduction apparatuses 700 and 702 is separate from a broadband network formed between the service server and a service reproduction apparatus. The first and second service reproduction apparatuses 700 and 702 may communicate with each other using a separate protocol and signals.

The control module 720 separates the service requested by the user from the services reproduced by the first service reproduction apparatus 700 (operation S830), and the data conversion module 740 converts data on the separated service into data that can be executed by the service reproduction apparatus requested by the user (operation S840). Then, the apparatus interface module 750 transmits the data to the second service reproduction apparatus 702, and the second service reproduction apparatus 702 reproduces the separated service.

Similarly, it may be easily understood by those of ordinary skill in the art that a functionally separable service can be separated from services reproduced by the second service reproduction apparatus 702 and that the separated service can be executed by another service reproduction apparatus.

Figure 9:
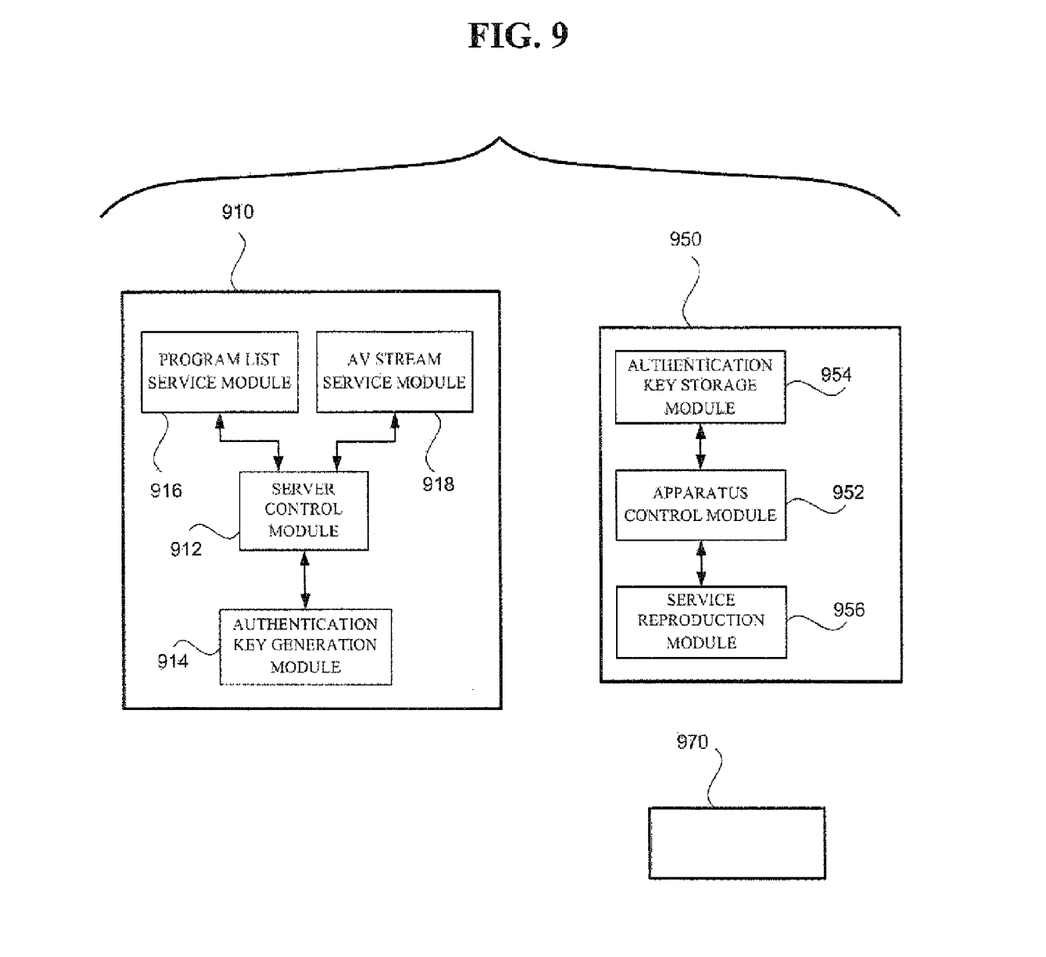
FIG. 9 is a block diagram of a service distribution system according to another exemplary embodiment of the present invention.

FIG. 9 is a block diagram of a service distribution system according to another exemplary embodiment of the present invention. Referring to FIG. 9, the service distribution system includes a service server 910, a first service reproduction apparatus 950, and a second service reproduction apparatus 970.

The service server 910 includes a server control module 912, an authentication key generation module 914, a program list service module 916, and an AV stream service module 918.

The server control module 912 manages the overall operation of the service server 910 and controls service distribution at the request of a service reproduction apparatus.

The authentication key generation module 914 generates authentication keys for executing services to be separated when service distribution requests are made by service reproduction apparatuses.

The program list service module 916 provides a program list service to a service reproduction apparatus at the request of the service reproduction apparatus. The AV stream service module 918 provides an AV stream service for a program selected by the user from the program list to the service reproduction apparatus. The program list service module 916 and the AV stream service module 918 are mere examples, and the service server 910 may further include service modules providing different types of services.

The first service reproduction apparatus 950 includes an apparatus control module 952, an authentication key storage module 954, and a service reproduction module 956.

The authentication key storage module 954 stores the authentication keys generated by the authentication key generation module 914 of the service server 910.

The apparatus control module 952 controls the overall operation of the first service reproduction apparatus 950 and makes a service distribution request to the service server 910. In addition, at the request of the second service reproduction apparatus 950, the apparatus control module 952 extracts an authentication key stored in the authentication key storage module 954 and provides the extracted authentication key to the second service reproduction apparatus 970.

The service reproduction module 956 reproduces services provided by the service server 910.

The second service reproduction apparatus 970 has the same structure as the first service reproduction apparatus 950.

A service distribution method used by the service server 910 and the first and second service reproduction apparatuses 950 and 970 illustrated in FIG. 9 will now be described in detail with reference to FIG. 10.

Figure 10:
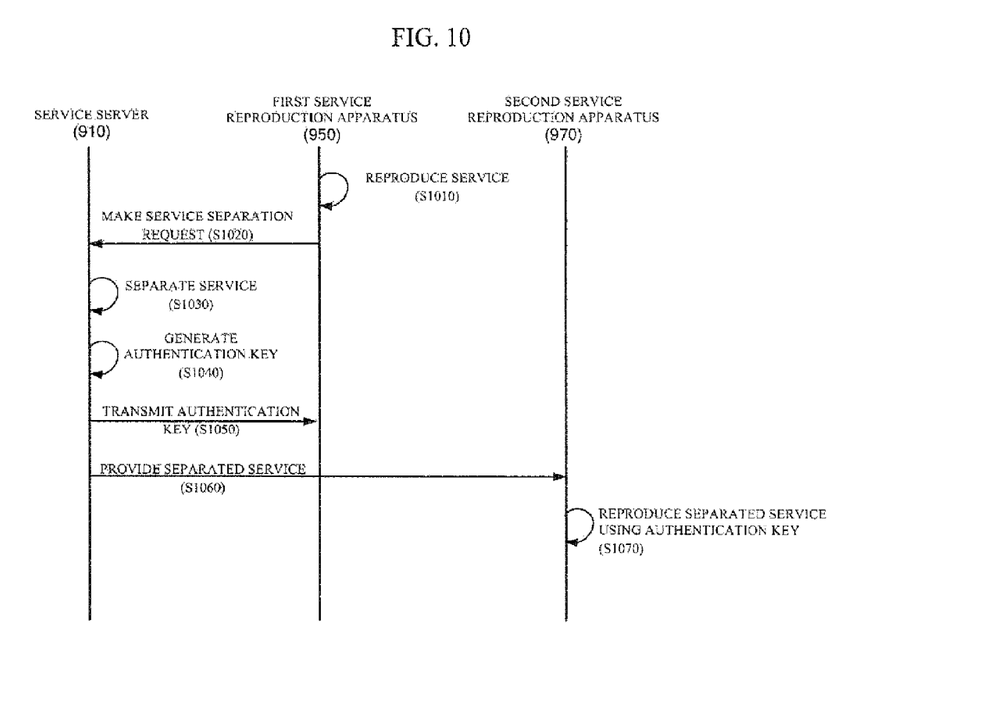
FIG. 10 illustrates a service distribution method according to another exemplary embodiment of the present invention.

Referring to FIG. 10, it is assumed that a user is reproducing one or more services provided by the service server 910 using the service reproduction module 956 of the first service reproduction apparatus 950 (operation S1010). If the user desires to reproduce some of the services being reproduced by the first service reproduction apparatus 950 or another service provided by the service server 910 using the second service reproduction apparatus 970, the user makes a service separation request to the service server 910 using the first service reproduction apparatus 950 (operation S1020).

Figure 11:
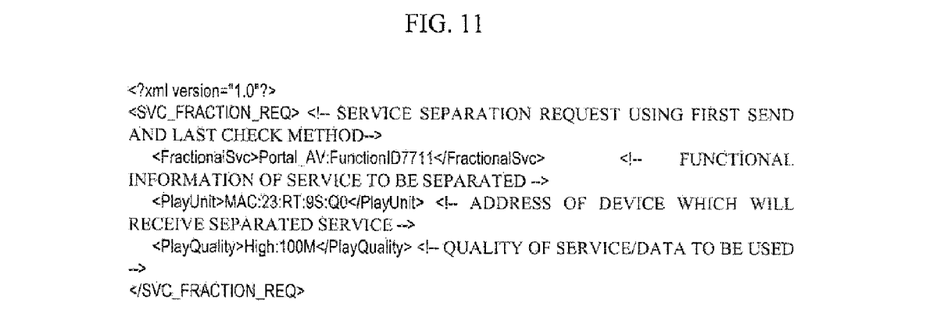
FIGS. 11 through 13 illustrate a data structure according to another exemplary embodiment of the present invention.

Here, a data structure of the service separation request transmitted by the first service reproduction apparatus 950 to the service server 910 may be represented in an XML form as illustrated in FIG. 11.

Referring to FIG. 11, an 'SVC_FRACTION_REQ' element is for making a service separation request. Specifically, a 'FractionalSVC' element indicates functional information of a service to be separated from the services reproduced by the first service reproduction apparatus 950, and a 'PlayUnit' element indicates identification information of a service reproduction apparatus that receives the separated service. In addition, a 'PlayQuality' element indicates resource information of the separated service to be used. In the present invention, it is assumed that the 'PlayUnit' element indicates the second service reproduction apparatus 970.

When the service server 910 receives the service separation request from the first service reproduction apparatus 950, the server control module 912 of the service server 910 separates a service from the services reproduced by the first service reproduction apparatus 950 (operation S1030), and the authentication key generation module 914 generates an authentication key for reproducing the separated service (operation S1040).

Then, the server control module 912 transmits the generated authentication key to the first service reproduction apparatus 950 (operation S1050). In this case, a data structure of the transmitted authentication key may be as illustrated in FIG. 12.

Figure 12:
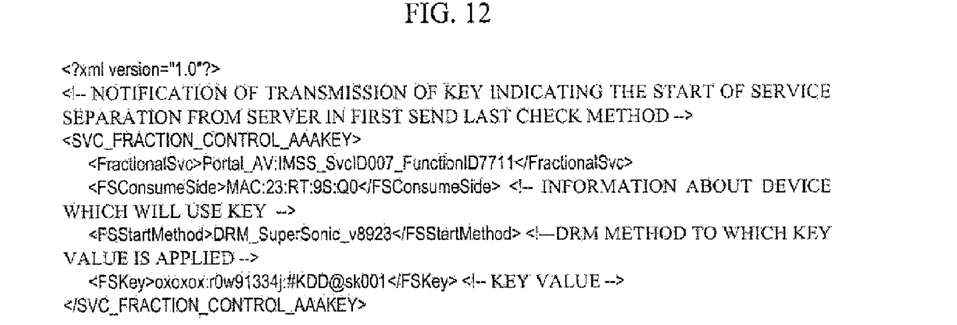

Referring to FIG. 12, an SVC_FRACTIONAL_CONTROL_AAAKEY' element is for transmitting an authentication key following service separation. Specifically, a 'FractionalSVC' element indicates functional information of a service to be separated from the services reproduced by the first service reproduction apparatus 950, and an 'FSConsumeSide' element indicates identification information of a service reproduction apparatus which will use an authentication key. In addition, an 'FSStartMethod' element indicates a digital rights management (DRM) method to which an authentication key value is applied, and an 'FSKey' element indicates an authentication key value. The apparatus control module 952 of the first service reproduction apparatus 950 stores the received authentication key in the authentication key storage module 954.

The service server 910 transmits the separated service to the second service reproduction apparatus 970 (operation S1060). Here, a data structure of the transmitted service may be as illustrated in FIG. 13.

Figure 13:
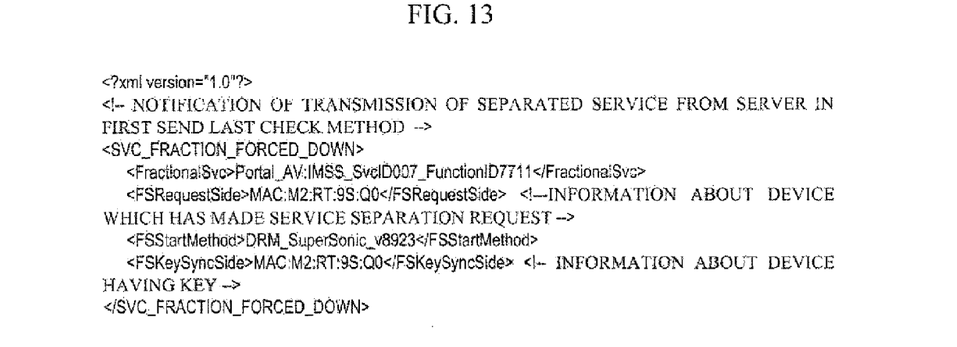

Referring to FIG. 13, an 'SVC_FRACTIONAL_FORCED_DOWN' element is for service separation. Specifically, a 'FractionalSVC' element indicates functional information of a service to be separated from the services reproduced by the first service reproduction apparatus 950, and an 'FSRequestSide' element indicates identification information of a service reproduction apparatus which has made the service separation request. In addition, an 'FSStartMethod' element indicates a DRM method to which an authentication key value is applied, and an 'FSKeySyncSide' element indicates identification information of a service reproduction apparatus having an authentication key.

Operations S1050 and S1060 may be performed in a reverse order.

When the second service reproduction apparatus 970 is to reproduce the separated service, it requires an authentication key generated by the service server 910.

If the first service reproduction 950 and the second service reproduction apparatus 970 can be connected to each other, the first service reproduction apparatus 950 transmits an authentication key stored in the authentication key storage module 950 to the second service reproduction apparatus 950, and the second service reproduction apparatus 970 reproduces the separated service using the received authentication key (operation S1080). If the first and second service reproduction apparatuses 950 and 970 are not directly connected to each other, the user may identify the authentication key stored in the authentication key storage module 950 of the first service reproduction apparatus 950 and directly input the authentication key to the second service reproduction apparatus 970.

Therefore, the user can use the AV stream provided by the AV stream service module 918 through the first service reproduction apparatus 950 and use the program list service provided by the program list service module 916 through the second service reproduction apparatus 970. Here, the second service reproduction apparatus 970 can reproduce the program list service using the authentication key generated by the service server 910.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented to execute one or more central processing units (CPUs) in a device or a security multimedia card.

As described above, the present invention distributes a plurality of services provided by a service provider to a plurality of services reproduction apparatuses according to a user's selection, thereby making it more convenient for the user to use the services.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation.

What is claimed is:

1. A service server comprising:
a processor coupled to a memory device;
a service module which provides a plurality of separable services;
an authentication key generation module which generates authentication keys for reproducing the plurality of separable services; and
a server control module which separates a requested service from the plurality of separable services in response to a service separation request and provides the separated service and an authentication key,
wherein the service module configures the plurality of separable services to be provided together to a first service reproduction apparatus, and
the server control module receives the service separation request from the first service reproduction apparatus to separate at least one of the plurality of separable services that are being reproduced by the first service reproduction apparatus from others of the plurality of separable services that are being reproduced by the first service reproduction apparatus, so that the at least one of the plurality of separable services is configured to be provided to a second service reproduction apparatus.

2. The server of claim 1, wherein the server control module transmits the authentication key to the first service reproduction apparatus which has made the service separation request and transmits the separated service to the second service reproduction apparatus which is to reproduce the separated service.

3. The server of claim 1, wherein the separated service is reproduced using the authentication key.

4. The server of claim 1, further comprising a program list service module which provides a program list service to the first service reproduction apparatus.

5. The server of claim 2, wherein, upon making the service separation request, the first service reproduction apparatus transmits the authentication key to the second reproduction apparatus.

6. A service distribution method comprising:
receiving a service separation request from a first service reproduction device;
separating, in response to the service separation request, at least one of a plurality of separable services that are being reproduced by the first service reproduction apparatus from others of the plurality of separable services that are being reproduced by the first service reproduction apparatus, so that the at least one of the plurality of separable services is configured to be provided to a second service reproduction apparatus;
generating an authentication key for reproducing the separated service;
transmitting the separated service and the generated authentication key to the second service reproduction apparatus.

7. The method of claim 6, wherein the transmitting the separated service and the generated authentication key comprises transmitting the generated authentication key to the first service reproduction apparatus which has made the service separation request and transmitting the separated service to the second service reproduction apparatus which is to reproduce the separated service.

8. A service reproduction apparatus comprising:
a processor coupled to a memory device;
a service reproduction module which reproduces a plurality of separable services;
an apparatus control module which makes a service separation request to a service server and receives an authentication key for reproducing a separated service which is separated from the plurality of separable services being reproduced by the service reproduction module according to the service separation request; and
an authentication key storage module which stores the received authentication key,
wherein the apparatus control module provides the received authentication key to another service reproduction apparatus,
the plurality of separable services are received together at the service reproduction apparatus, and
the apparatus control module receives the service separation request from a user interface, which is provided by the service reproduction apparatus and is operable to receive a user input, to separate at least one of the plurality of separable services that is being reproduced by the service reproduction module from others of the plurality of separable services that are being reproduced by the service reproduction module, so that the at least one of the plurality of separable services is configured to be provided to the other service reproduction apparatus for reproduction by the other service reproduction apparatus.

9. A service reproduction apparatus comprising:
a processor coupled to a memory device;
an apparatus control module which receives, from a service server, a separated service of a plurality of separable services provided together to another service reproduction apparatus that is separated from others of the plurality of separable services that are being reproduced by the other service reproduction apparatus according to a service separation request, and which receives an authentication key for reproducing the separated service from the other reproduction apparatus which has made the service separation request; and
a service reproduction module which reproduces the separated service using the received authentication key,
wherein one of the service server and the other service reproduction apparatus separates a functionally separable service from the plurality of separable services upon receiving the service separation request input by the other reproduction apparatus while the plurality of separable services are being reproduced by the other service reproduction apparatus.

10. A service distribution method comprising:
making a service separation request by a service reproduction apparatus to a service server;
receiving an authentication key for reproducing a separated service of a plurality of separable services that is separated from others of the plurality of separable services that are being reproduced by the service reproduction apparatus according to the service separation request;
providing the received authentication key to another service reproduction apparatus which receives the separated service from the service server,
wherein the service separation request from the service reproduction apparatus to separate at least one of the plurality of separable services that are being reproduced by the service reproduction apparatus from others of the plurality of separable services that are being reproduced by the service reproduction apparatus, so that the at least one of the plurality of separable services is configured to be provided to the other service reproduction apparatus.

11. A service distribution method comprising:
receiving, by a first reproduction apparatus, a separated service of a plurality of separable services that is separated from others of the plurality of separable services that are being reproduced by a second service reproduction apparatus according to a service separation request made by the second service reproduction apparatus;
receiving an authentication key for reproducing the separated service from the second service reproduction apparatus; and
reproducing the separated service using the received authentication key,
wherein the service separation request from the second service reproduction apparatus to separate at least one of the plurality of separable services that are being reproduced by the second service reproduction apparatus from others of the plurality of separable services that are being reproduced by the second service reproduction apparatus, so that the at least one of the plurality of separable services is configured to be provided to a first service reproduction apparatus.

12. A service distribution method comprising:
registering group information regarding service reproduction apparatuses in a service server;
reproducing a plurality of separable services provided by the service server;
making a service separation request using a first service reproduction apparatus which receives a plurality of separable services together;
separating, in response to the service separation request, at least one of the plurality of separable services from others of the plurality of separable services that are being reproduced by the first service reproduction apparatus so that the at least one of the plurality of separable services is configured to be reproduced by a second service reproduction apparatus;
receiving a separated service at a second service reproduction apparatus; and
reproducing the received service using the second service reproduction apparatus,
wherein, upon making the service separation request, the first service reproduction apparatus transmits the authentication key to the second reproduction apparatus.

* * * * *